S. S. MILLER.
Automatic Wagon-Brake.

No. 206,472. Patented July 30, 1878.

WITNESSES:
Chas. Nida.
C. Sedgwick

INVENTOR:
S. S. Miller
BY Munn & Co
ATTORNEYS.

UNITED STATES PATENT OFFICE.

STEPHEN S. MILLER, OF CLAVERACK, NEW YORK.

IMPROVEMENT IN AUTOMATIC WAGON-BRAKES.

Specification forming part of Letters Patent No. 206,472, dated July 30, 1878; application filed May 4, 1878.

*To all whom it may concern:*

Figure 1:
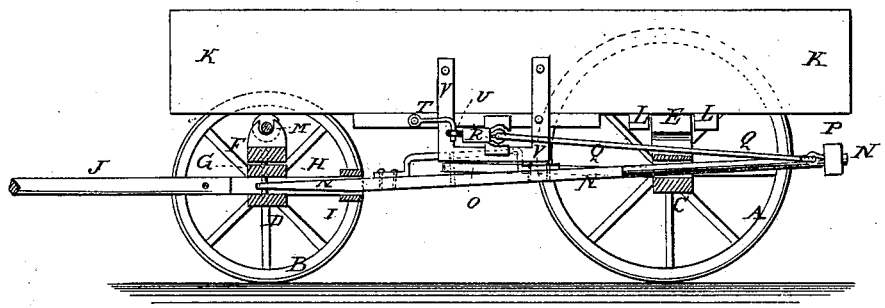
Figure 2:
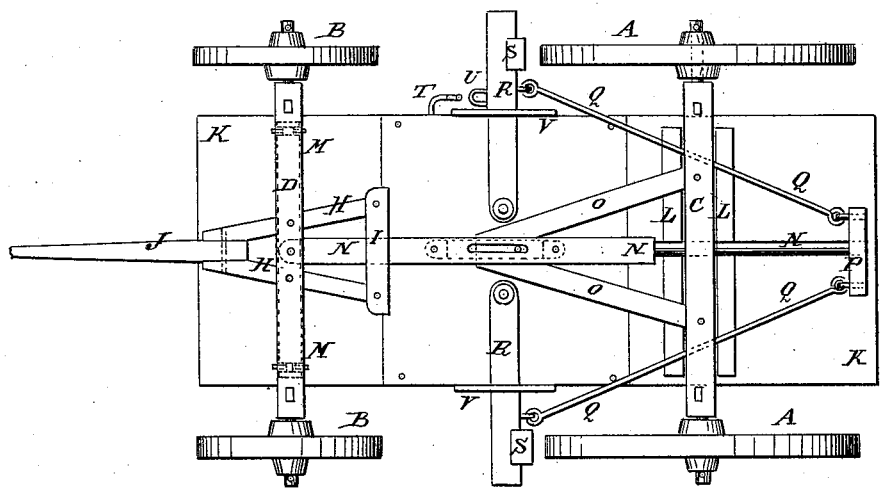

Be it known that I, STEPHEN S. MILLER, of Claverack, in the county of Columbia and State of New York, have invented a new and useful Improvement in Automatic Wagon-Brakes, of which the following is a specification:

Figure 1 is a side view of a wagon to which my improvement has been applied, partly in section through the running-gear, to show the construction. Fig. 2 is a bottom view of the same.

Similar letters of reference indicate corresponding parts.

The object of this invention is to furnish an improved brake for attachment to wagons which shall be so constructed as to be applied to the wheels by the forward movement of the wagon against the horses in going down an incline, and which shall be simple in construction and reliable in operation.

The invention will first be described in connection with the drawing, and then pointed out in the claim.

A represents the rear wheels, and B the forward wheels, of a wagon, which revolve upon the journals of the axles C D in the usual way. E is the rear bolster. F is the forward bolster. G is the sand-board. H are the forward hounds. I is the sway-bar, and J is the tongue, about the construction of which there is nothing new.

K is the wagon-body, the rear part of which rests upon the rear bolster, E, and is kept from longitudinal movement upon the said bolster by cleats L, attached to it at such a distance apart as to receive the said bolster E between them. The forward part of the wagon-body K rests upon the roller M, placed above the forward bolster, F, and resting and turning in supports attached to the said bolster.

N is the reach, the forward end of which is pivoted to the king-bolt in the usual way. The middle part of the reach N is slotted to receive the bolt that connects the rear hounds O with the said reach. The rear part of the reach N passes through a hole in the rear bolster, so that the rear part of the wagon-gearing may move forward toward the forward part of said gearing.

To the rear end of the reach N is attached a short cross-bar, P, to the ends of which are pivoted the ends of two bars, Q. The bars Q pass forward between the rear axle C and the rear bolster, E, and their forward ends are pivoted to the brake-bars R. The inner ends of the brake-bars R are pivoted to the bottom of the wagon-body K, and their outer ends project to such a distance that the brake-shoes S attached to them may come in contact with the faces of the wheels A.

With this construction, when the wagon is going down an incline the forward pressure of the load causes the rear part of the gearing and the wagon-body to move forward upon the reach N and the forward part of the running-gear. This forward movement causes the brake-bars R to be drawn back, bringing the brake-shoes S against the faces of the wheels A with a force equal to the forward pressure of the load, so that the brake may be applied automatically and with a force corresponding with the pressure of the load. As soon as the horses again begin to draw, the forward part of the gearing will be drawn forward, withdrawing the brake-shoes from the wheels.

T is a hook, pivoted to the side of the wagon-body K, in such a position that it may be hooked into an eye or staple, U, attached to the brake-bar R, to enable the wagon to be backed, when desired, without applying the brake. The brake-bars R are supported in place against the bottom of the wagon-body K by keepers V, attached to the sides of the said wagon-body.

I am aware that it is not new to connect the brake-levers at their inner ends with the wagon-body so that the latter will slide and operate the levers; but

What I claim is—

The combination, with a wagon-body rigidly secured to the rear gearing, and sliding therewith on the reach, of the brake-bar R, pivoted to the body, and connected by rods Q with a cross-bar, P, attached to the rear end of the reach, as shown and described.

STEPHEN S. MILLER.

Witnesses:
GEORGE B. SWEET,
WILLIAM SKINKLE.